United States Patent [19]

Mizutani et al.

[11] Patent Number: 5,722,054
[45] Date of Patent: Feb. 24, 1998

[54] COMMUNICATION APPARATUS

[75] Inventors: Koichi Mizutani; Hiroyuki Yatsu, both of Tokyo, Japan

[73] Assignee: Canon Kabushiki Kaisha, Tokyo, Japan

[21] Appl. No.: 394,294

[22] Filed: Feb. 24, 1995

[30] Foreign Application Priority Data

Feb. 28, 1994 [JP] Japan ........................... 6-054501
Jan. 18, 1995 [JP] Japan ........................... 7-23453

[51] Int. Cl.$^6$ ........................... H04B 1/40
[52] U.S. Cl. ........................... 455/88; 455/68; 455/70
[58] Field of Search ........................... 455/33.1, 54.1, 455/422, 517, 45, 68, 70, 426; 379/61, 63, 93, 351, 386; 370/525, 526; 375/362, 364

[56] References Cited

U.S. PATENT DOCUMENTS

| | | |
|---|---|---|
| 4,885,763 | 12/1989 | O'Brien et al. ........................... 379/351 |
| 4,996,708 | 2/1991 | Kakizawa . |
| 5,093,857 | 3/1992 | Yoshida et al. . |
| 5,165,096 | 11/1992 | Matsumoto . |
| 5,222,126 | 6/1993 | Nishino . |
| 5,317,629 | 5/1994 | Watanabe . |
| 5,375,163 | 12/1994 | Kamimoto et al. ........................... 379/61 |

FOREIGN PATENT DOCUMENTS 406121024 4/1994 Japan ........................... 379/61

Primary Examiner—Chi H. Pham
Assistant Examiner—Gertrude Arthur
Attorney, Agent, or Firm—Morgan & Finnegan, L.L.P.

[57] ABSTRACT

A communication apparatus comprising a detector for detecting a standard DTMF signal when a clock of a predetermined frequency is supplied, an operating unit for executing an operation such as display or communication according to a detection output of the detector to which a clock other than the predetermined frequency was supplied, and a supply unit for supplying the clock other than the predetermined frequency to the detector.

38 Claims, 15 Drawing Sheets

COMMUNICATION APPARATUS

BACKGROUND OF THE INVENTION

1. Field of the Invention

The present invention relates to a communication apparatus for receiving a communication signal and a control signal.

2. Related Background Art

A conventional cordless telephone typically has two kinds of channels such as speech channel and control channel. After the transmission and reception of the control signal occurs using the control channel and a speech path has been established, the transmission and reception of a voice signal representing speech occurs using a speech channel. In this instance, an MSK (Minimum Shift Keying: a kind of Frequency Shift Keying) signal is used as a control signal. Such a system is a modulation system of replacing, for example, data "0" to the sine wave of 2400 Hz and data "1" to the sine wave of 1200 Hz.

In case of transmitting the control signal in an in-speech state, for instance, when a turn-on control of an external line LED of a mobile unit is performed from a master of the cordless telephone apparatus or when information of the button operation of the mobile unit or the like is notified to the master, since the control signal is transmitted or received by the speech channel, the user hears a sound of a modulation singal.

As a countermeasure, hitherto, there is a method of using a modem using a signal of a voice frequency band (300 to 3000 Hz) or lower as a carrier signal, namely, a low-speed modem.

According to such a method, for example, since data "0" is replaced to the sine wave of 250 Hz and the data "1" is replaced to the sine wave of 150 Hz, the user doesn't hear the sound of the modulation signal even in the in-speech state. However, there are drawbacks such that the low-speed modem is expensive, a filter of steep characteristics is needed at the front stage of a reception unit, and such a filter is also expensive.

Although there is a countermeasure for avoiding such a modulation signal sound by a function reduction such that the turn-on control of the external line LED is not performed in the in-speech state, when such a measure is used, an operational performance is remarkably deteriorated.

SUMMARY OF THE INVENTION

It is an object of the invention to decrease the costs of a countermeasure for an adverse influence due to a control signal.

It is another object of the invention that a signal of a frequency which hardly exerts an influence on another communication is detected by using a general DTMF receiver.

It is still another object of the invention to communicate a control signal at a high speed without exerting any influence on a communication that is being executed or so long as the communication is not executed.

The above and other objects and features of the present invention will become apparent from the following detailed description and the appended claims with reference to the accompanying drawings.

DETAILED DESCRIPTION OF THE PREFERRED EMBODIMENTS

Figure 1:
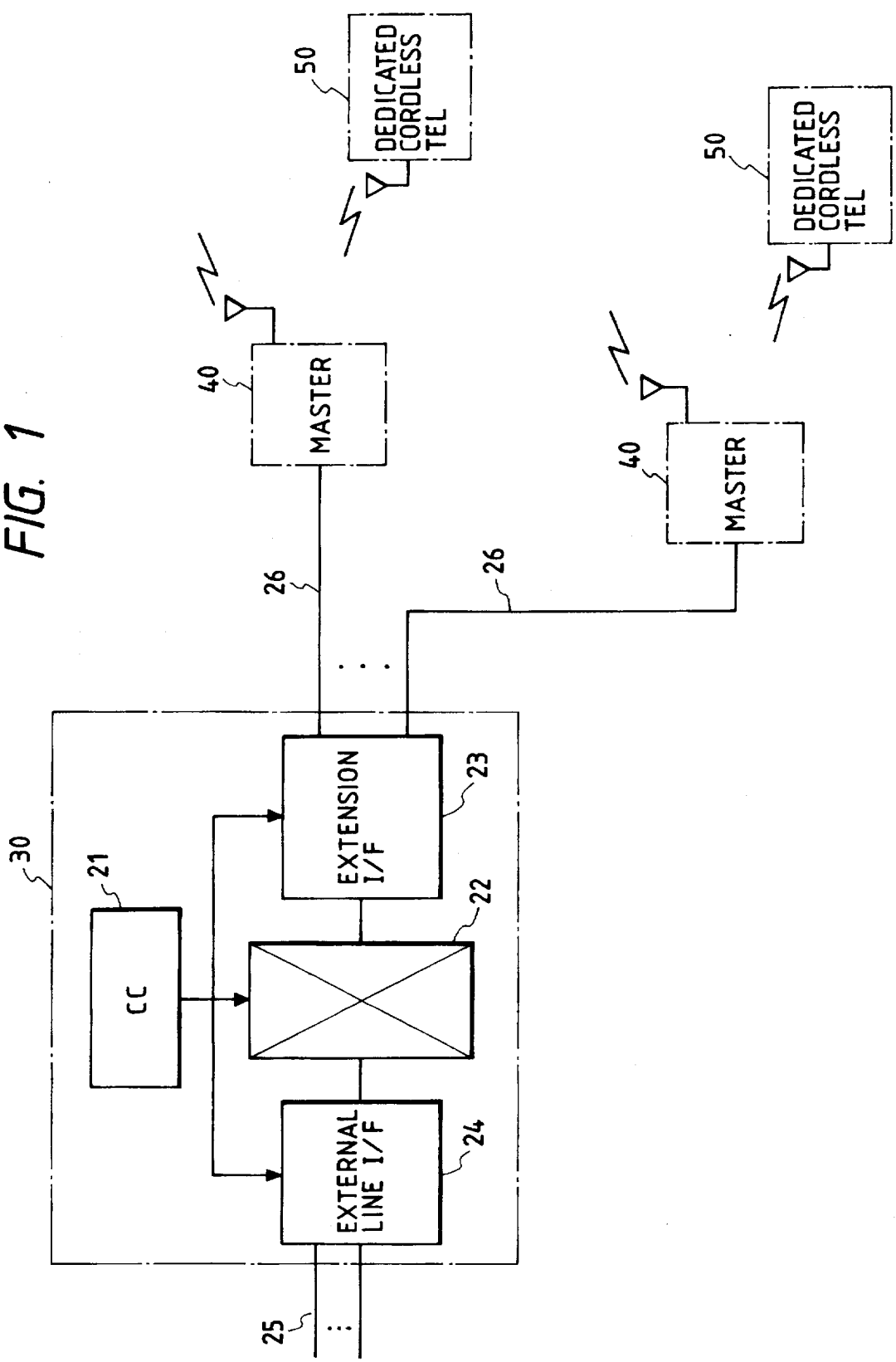
FIG. 1 is a block diagram showing a whole construction which is common in each embodiment of the invention.

FIG. 1 is a block diagram showing a construction of a cordless button telephone apparatus according to the first embodiment of the present invention.

A main apparatus 30 comprises: an external interface 24 for accommodating external lines 25; a speech path switch 22 for performing a switching operation; an extension interface (hereinafter, interface is also referred to as an I/F) 23 for accommodating extension terminals; and a central control unit (hereinafter, also referred to as a CC) 21 for performing a control (switching control or the like) of each unit of the main apparatus 30.

A master 40 is accommodated in the extension I/F 23 of the main apparatus 30 through a line 26. A dedicated cordless telephone 50 is connected to the master 40 in a wireless manner.

The dedicated cordless telephone 50 and the master 40 communicate through a control channel or a speech channel.

Figure 2:
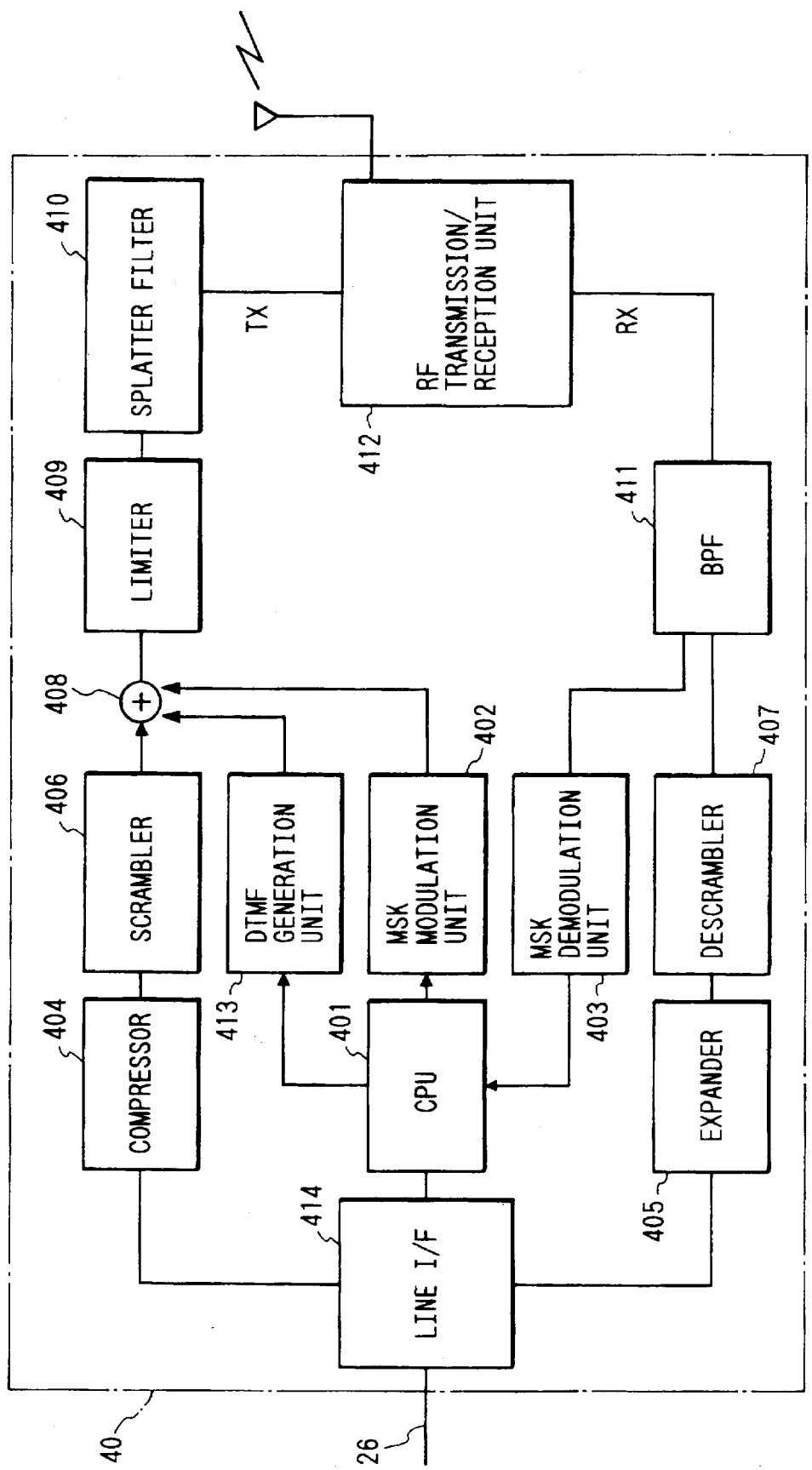
FIG. 2 is a block diagram showing a construction of a master in the first and second embodiments of the invention.

FIG. 2 is a block diagram showing a construction of the master 40 in the first embodiment.

The master 40 comprises: a control unit (CPU) 401 for controlling each unit of the master 40; an MSK modulation unit 402 for modulating data of control information generated from the CPU 401 and for transmitting the modulated data as an MSK signal; an MSK demodulation unit 403 for demodulating the received MSK signal and extracting the data of the control information and transmitting to the CPU 401; an RF transmission/reception unit 412 for transmitting and receiving a speech signal and a control signal by a radio communication with the dedicated cordless telephone 50; a DTMF generation unit 413 for forming a DTMF signal outside voice frequency band by the control of the CPU 401; and a line interface 414 for transmitting and receiving the speech signal and control signal to/from the main apparatus 30.

As a transmission system to the dedicated cordless telephone 50, the master 40 further includes a compressor 404, a scrambler 406, an adding circuit 408, a limiter 409, and a splatter filter 410. As a reception system from the dedicated cordless telephone 50, the master 40 also includes a band pass filter (BPF) 411 for allowing only the signal of the voice frequency band to pass, a descrambler 407, and an expander 405.

An output of the DTMF generation unit 413 is superimposed on the speech signal from the scrambler 406 by the adding circuit 408 and the resultant signal is transmitted to the dedicated cordless telephone 50. The transmission and reception will be described hereinlater in detail.

Figure 3:
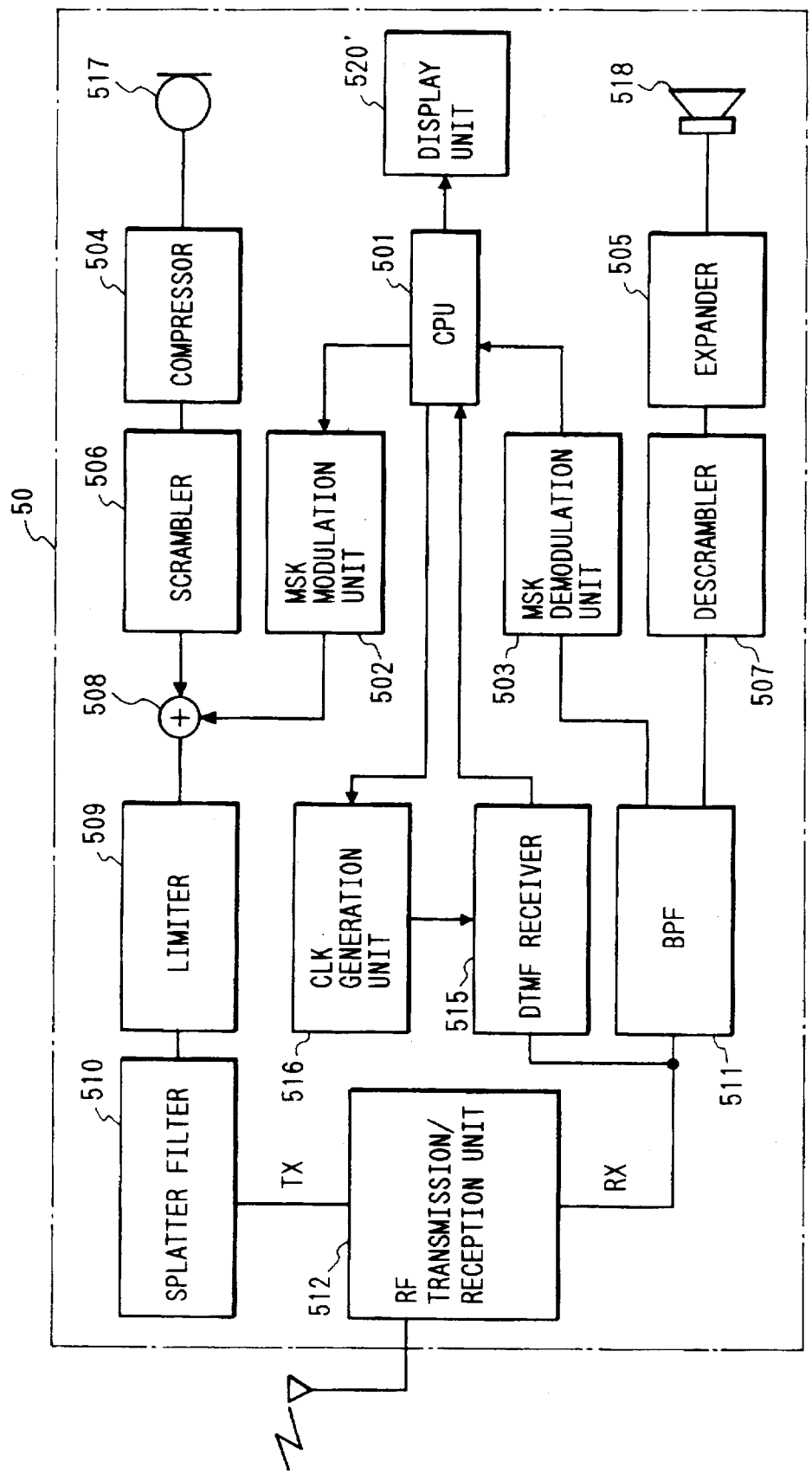
FIG. 3 is a block diagram showing a construction of a dedicated cordless telephone in the first embodiment of the invention.

FIG. 3 is a block diagram showing a construction of the dedicated cordless telephone 50 of the first embodiment.

The dedicated cordless telephone 50 comprises: a control unit (CPU) 501 for controlling each unit of the dedicated cordless telephone; an MSK modulation unit 502 for modulating data of control information generated from the CPU 501 and transmitting the resultant data as an MSK signal; an MSK demodulation unit 503 for demodulating the received MSK signal and extracting the data of the control information and transmitting to the CPU 501; an RF transmission/ reception unit 512 for performing the transmission and reception of the speech signal and control signal by a radio communication with the master 40; a DTMF receiver 515 for receiving and detecting the DTMF signal outside voice frequency band from the master transmitted and for notifying to the CPU 501; and a clock generation unit 516 for generating an operation clock of the DTMF receiver 515. A clock frequency which is generated from the clock generation unit 516 is controlled by the CPU 501 so that the DTMF receiver 515 receives the DTMF signal outside voice frequency band.

As a transmission system to the master 40, the dedicated cordless telephone 50 further includes a transmitter 517, a compressor 504, a scrambler 506, an adding circuit 508, a limiter 509, and a splatter filter 510. As a reception system from the master 40, the dedicated cordless telephone 50 also includes a band pass filter 511 for allowing only the signal of the voice frequency band to pass, a descrambler 507, an expander 505, and a receiver 518. The transmission and reception will be described hereinafter in detail.

Figure 4:
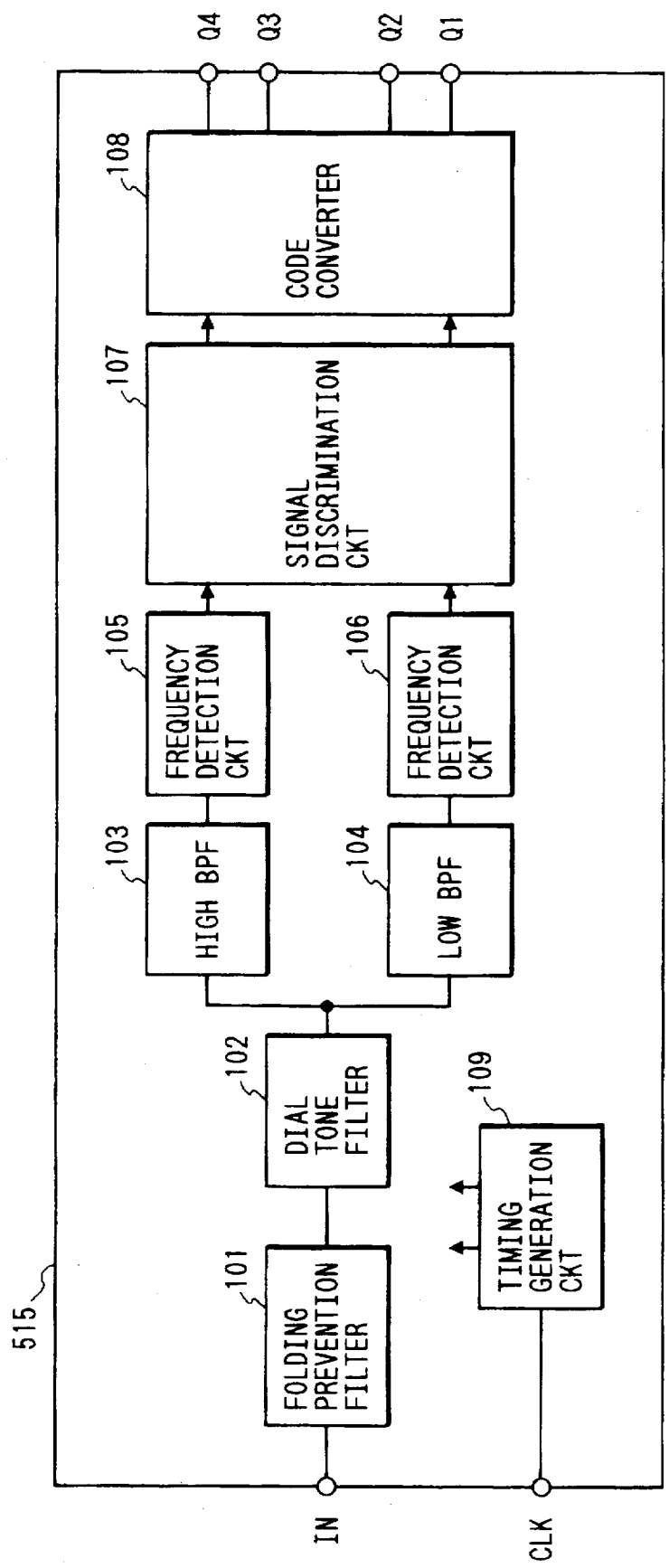
FIG. 4 is a block diagram showing a construction of a DTMF receiver which is common in each embodiment of the invention.

FIG. 4 is a block diagram showing a detailed construction of the DTMF receiver 515.

As shown in the diagram, the DTMF receiver 515 comprises: a folding prevention filter 101; a dial tone filter 102; a high band pass filter (BPF) 103; a low band pass filter (BPF) 104; frequency detection circuits 105 and 106; a signal discrimination circuit 107, a code converter 108; and a timing generation circuit 109.

Among them, each of the dial tone filter 102, high BPF 103, and low BPF 104 is constructed by a switched capacitor filter. A cut-off frequency fC of the switched capacitor filter is determined by a switching clock frequency fCLK and is generally designed so as to satisfy the following equation.

$$fC = (1/100) fCLK \quad (1)$$

The timing generation circuit 109 divides a frequency of a clock that is inputted from an input terminal CLK and forms a switching clock of each switched capacitor filter. Since the cut-off frequency fC is decided by a frequency fX of the clock inputted to the input terminal CLK, therefore, a frequency of the DTMF signal which is received and detected is determined.

The folding prevention filter 101 is a filter to block the switching clock which is supplied to each of the switched capacitor filters of the units 102 to 104 from the input signal and is constructed by an RC active filter.

A signal supplied from an input terminal IN passes through the folding prevention filter 101 and dial tone filter 102 and is separated into a high frequency signal and a low frequency signal by the high BPF 103 and low BPF 104.

The frequencies of the separated signals are detected by the frequency detection circuits 105 and 106, respectively. Either one of 16 kinds of dials [1] to [D] is discriminated by the signal discrimination circuit 107. The discrimination result is converted to the binary number by the code converter 108 and is outputted to Q1 to Q4.

Ordinarily, the clock of 3.579545 MHz is inputted from the input terminal CLK and the DTMF signals within low frequencies of 697 to 941 Hz and within high frequencies of 1209 to 1633 Hz are detected.

Figure 5:
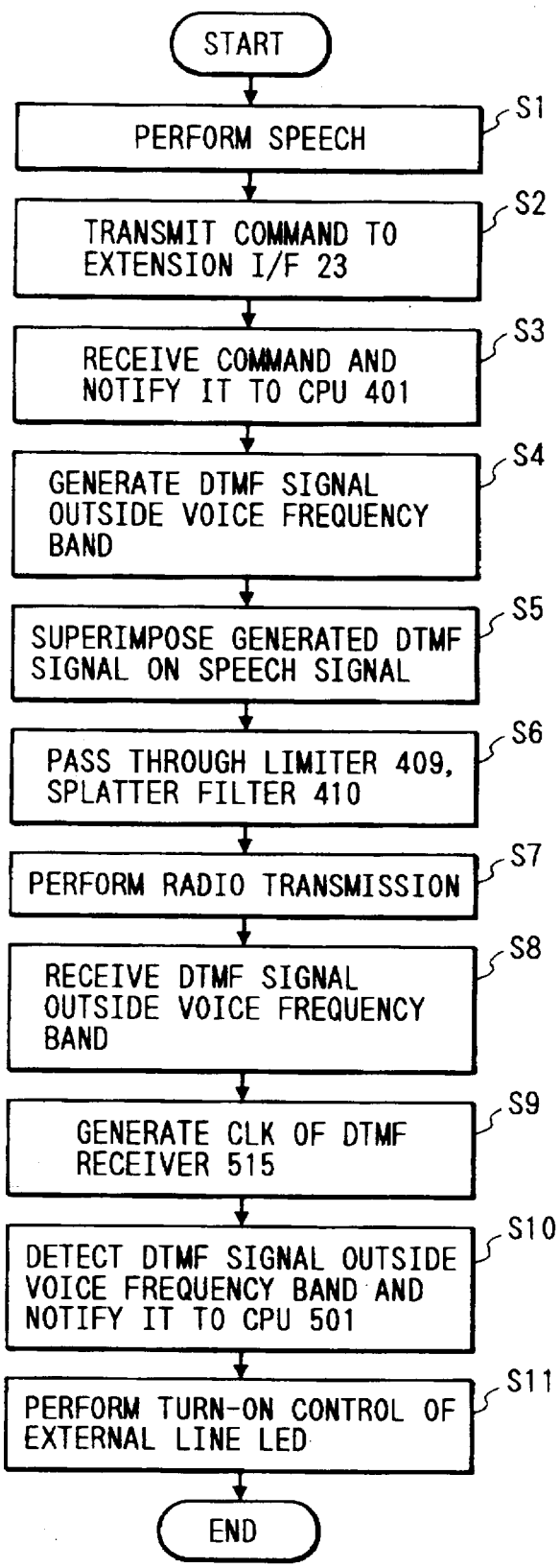
FIG. 5 is a flowchart showing the operation in the first embodiment of the invention.

A flow of the operation of the embodiment will now be described in accordance with a flowchart of FIG. 5. The flowchart shown in the diagram shows an example in the case where the turn-on control information of the external line LED is transmitted.

When the dedicated cordless telephone 50 is in the in-speech state with another extension or external line through the master 40 and speech channel (S1), if a use situation of the external line 25 changes, the CC 21 detects it and transmits a corresponding command to the extension I/F 23 in order to perform the turn-on control of the external line LED of a display unit 520' of the dedicated cordless telephone 50 (S2). The master 40 receives such a command by the line I/F 414 and notifies to the CPU 401 (S3).

The CPU 401 controls the DTMF generation unit 413 in order to generate the DTMF signal outside voice frequency band corresponding to such a command (S4). In recent years, a one-chip microcomputer generally has therein a D/A converter, so that the DTMF signal can be formed by the CPU 401. The formed DTMF signal outside voice frequency band is superimposed on the speech signal by the adding circuit 408 (S5). An amplitude of the resultant signal is limited by the limiter 409 in a manner similar to that in case of an ordinary speech and a high voice frequency component which becomes a cause of an overmodulation is cut out by the splatter filter 410 (S6). The resultant signal is frequency modulated and is radio transmitted to the dedicated cordless telephone 50 by the RF transmission/reception unit 412 (S7).

In the dedicated cordless telephone 50, a frequency demodulation is performed by the RF transmission/ reception unit 512 and the original DTMF signal outside voice frequency band is received (S8). A clock such as to receive the DTMF signal outside voice frequency band is supplied to the DTMF receiver 515 from the clock generation unit 516. The clock frequency fX which is generated from the clock generation unit 516 is controlled by the CPU 501 (S9).

As described in the foregoing equation (1) and subsequent paragraphs, the frequency of the DTMF signal which is received and detected is decided by fX. Assumed that, fX =600 kHz, the DTMF signals within low frequencies of 117 to 158 Hz and within high frequencies of 203 to 274 Hz are detected (S10). That is, 697 Hz ×(600 kHz/3580 kHz) =117 Hz
941 Hz ×(600 kHz/3580 kHz) =158 Hz
1209 Hz ×(600 kHz/3580 kHz) =203 Hz
1633 Hz ×(600 kHz/3580 kHz) =274 Hz Since each of those signals lies in the voice frequency band or lower and is cut out by the BPF 511, it is not heard from the receiver 518. The detection result is notified to the CPU 501 and the CPU 501 performs the turn-on control of the external line LED of the self apparatus in accordance with a rule of the corresponding command (S11).

In the above embodiment, although the control signal has been communicated by using the DTMF signal outside voice frequency band through the speech channel, the control signal is communicated by using the MSK modulation signal of the voice frequency band through the control channel.

According to the above embodiment, the transmission of the control signal by the DTMF signal outside voice frequency band in the in-speech state has been performed in one direction from the master 40 to the dedicated cordless telephone 50. As will be described in the third and fourth embodiments, the control signal can be also transmitted in two-way directions by providing transmitting means for transmitting from the dedicated cordless telephone 50 to the master 40.

According to the above embodiment, although the explanation has been made with respect to the example of the DTMF receiver 515 comprising the switched capacitor filter, the invention is not limited to the construction of the above embodiment so long as the cut-off frequency is decided by the clock that is inputted. For example, an apparatus such as a digital signal processor (DSP) or the like which realizes a filter by a digital process can be also used.

Although the DTMF signal of the voice frequency band or lower has been used as a control signal, generally, since a reproduction level of a receiver or a speaker for a telephone is almost equal to zero for frequencies lower than 400 Hz as a frequency of the dial tone, even when the DTMF signal near the lower limit of the voice frequency band is used, a similar effect is obtained.

In the above embodiment, further, although the turn-on control information of the external line LED has been described as an example in the control signal transmission in the in-speech state, the invention can be also similarly applied to a case of realizing another service (for instance, a clock display of liquid crystal is changed or the like).

The second embodiment of the invention will now be described.

According to the second embodiment, the DTMF signal near the lower limit of the voice frequency band is transmitted as a control signal by the speech channel. A general DTMF receiver is used to receive such a signal and a frequency to be received and detected is changed by changing an operation clock, thereby matching to the DTMF signal near the lower limit of the voice frequency band. During the reception, speech characteristics of the receiver and speaker are corrected so as to suppress the frequency characteristics near the lower limit of the voice frequency band.

Figure 6:
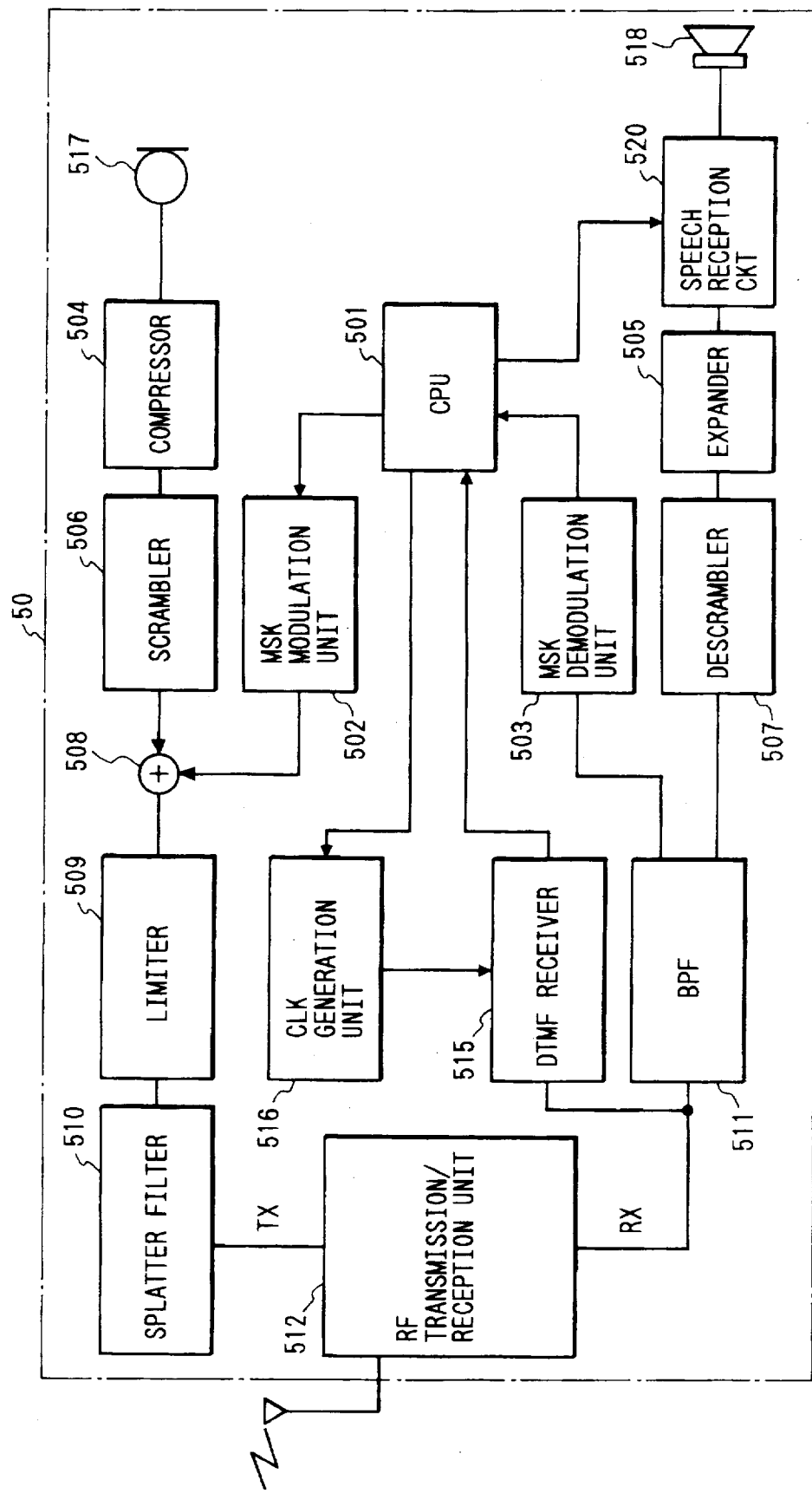
FIG. 6 is a block diagram showing a construction of a dedicated cordless telephone in the second embodiment of the invention.

FIG. 6 is a block diagram showing a construction of the dedicated cordless telephone 50 in the second embodiment.

In the dedicated cordless telephone 50, a speech reception circuit 520 is arranged between the expander 505 and the receiver 518. The speech reception circuit 520 corrects the speech characteristics of the receiver 518 and a loud speaker (not shown).

Figure 7:
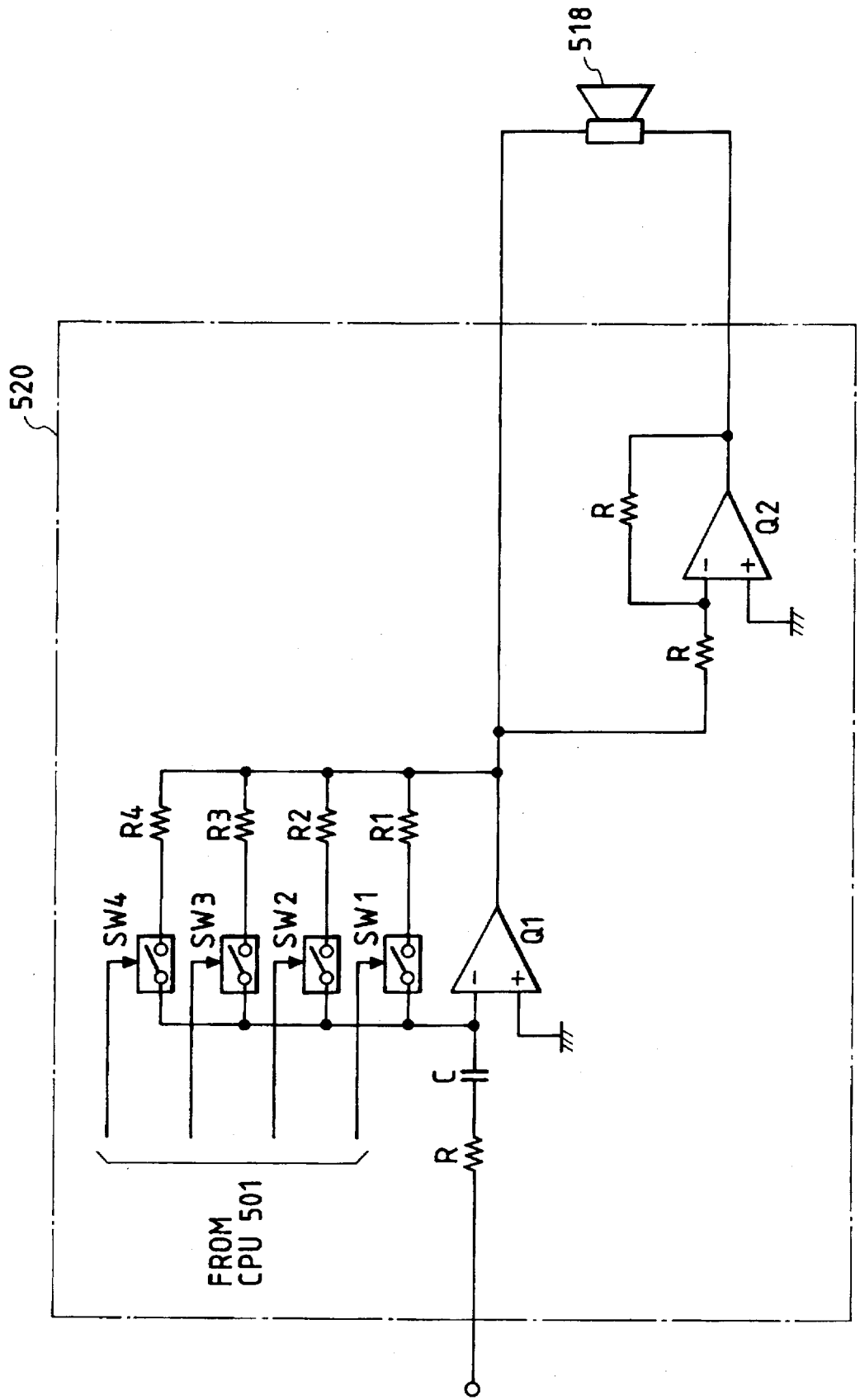
FIG. 7 is a block diagram showing a construction of a speech reception circuit in the second embodiment of the invention.

FIG. 7 is a circuit diagram showing a detailed construction of the speech reception circuit 520.

The speech reception circuit 520 realizes a high pass filter by an RC active filter comprising a capacitor C, feedback resistors Ri (i =1 to 4), and a differential amplifier Q1. By switching the feedback resistors Ri by the control signal from the CPU 501 through switches SWi (i =1 to 4), the cut-off frequency is changed, thereby changing the speech characteristics.

In an ordinary speech, Ri =R1. A value of R1 is set so as to be the cut-off frequency which exerts no influence on the voice frequency band. R2, R3, and R4 are set to values so as to cut out the signals near the lower limit of the voice frequency band, namely, about 300 to 400 Hz.

It is assumed that the other component elements are common to those of the above first embodiment (FIGS. 1 to 4), the same component elements are designated by the same reference numerals and individual explanation is omitted here.

Figure 8:
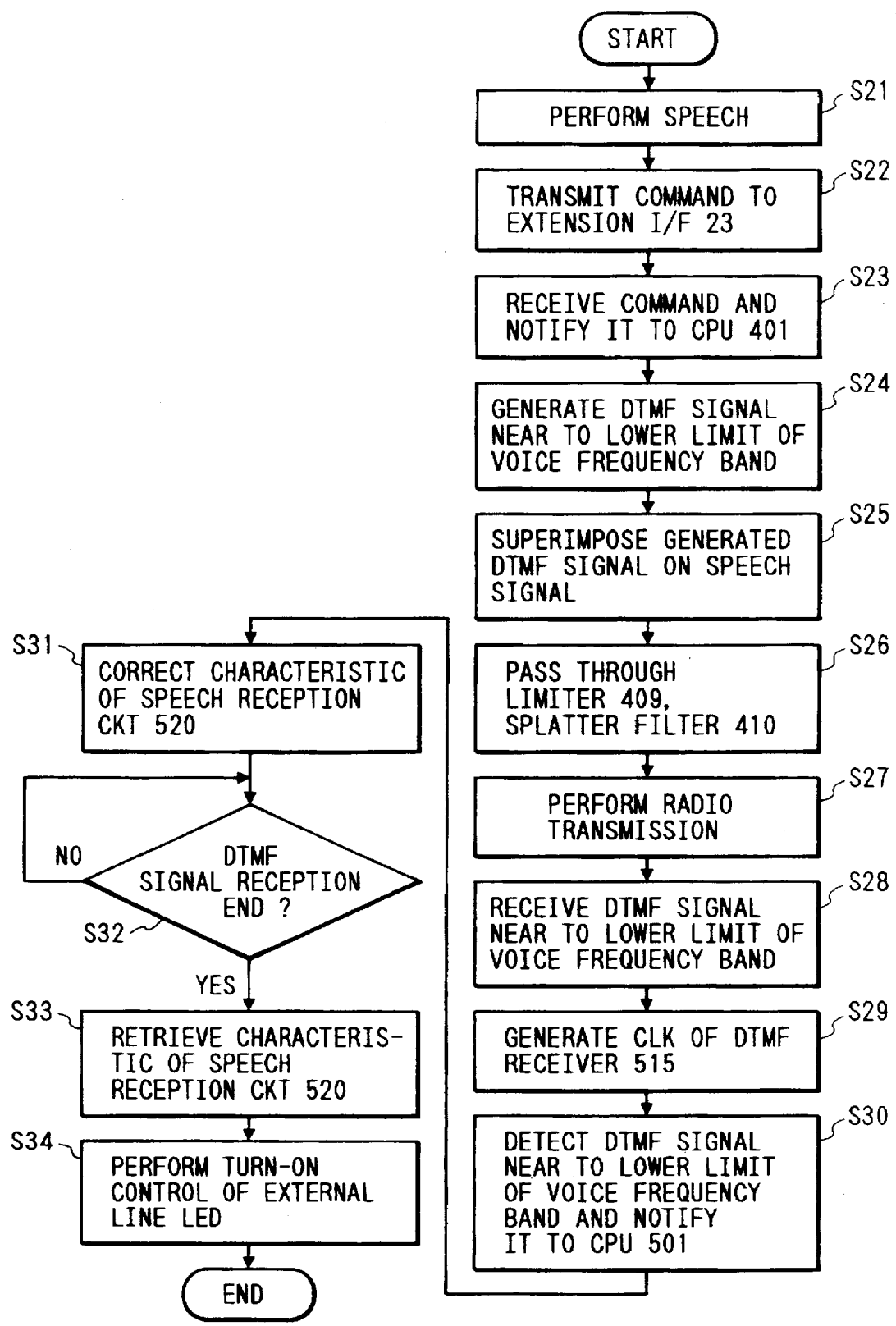
FIG. 8 is a flowchart showing the operation in the second embodiment of the invention.

The operation of the second embodiment will now be explained on the basis of a flowchart of FIG. 8. The flowchart shown in the diagram shows an example of a case of transmitting the turn-on control information of the external line LED.

In the case where the dedicated cordless telephone 50 is communicating with another extension or external line through the master 40 (S21), when a use situation of the external line 25 changes, the CC 21 detects it and transmits a corresponding command to the extension I/F 23 in order to perform the turn-on control of an external line LED (not shown) of the dedicated cordless telephone 50 (S22). The master 40 receives such a command by the line I/F 414 and notifies it to the CPU 401 (S23).

The CPU 401 controls the DTMF generation unit 413 so as to form the DTMF signal which corresponds to the command and is near the lower limit of the voice frequency band (S24). As also described in the first embodiment, in recent years, a one-chip microcomputer generally has a built-in D/A converter therein and the DTMF signal can be formed by the CPU 401.

The formed DTMF signal near the lower limit of the voice frequency band is superimposed on the speech signal by the adding circuit 408 (S25), an amplitude of the resultant signal is limited by the limiter 409 in a manner similar to that in an ordinary in-speech state, and the high frequency component which becomes a cause of an overmodulation is cut out by the splatter filter 410 (S26). The resultant signal is frequency modulated by the RF transmission/reception unit 412 and is transmitted to the dedicated cordless telephone 50 in a wireless manner (S27).

In the dedicated cordless telephone 50, the signal is frequency demodulated by the RF transmission reception unit 512 and the original DTMF signal near the lower limit of the voice frequency band is received (S28). A clock such as to receive the DTMF signal near the lower limit of the voice frequency band is supplied from the clock generation unit 516 to the DTMF receiver 515. The clock frequency fX which is generated from the clock generation unit 516 is controlled by the CPU 501 (S29).

As described in the foregoing equation (1) and subsequent paragraphs, the frequency of the DTMF signal to be received and detected is determined by fX. Assuming that fX =800 kHz, the DTMF signals within low frequencies of 165 to 223 Hz and within high frequencies of 287 to 388 Hz are detected (S30). That is, 697 Hz ×(800 kHz/3580 kHz) =165 Hz
941 Hz ×(800 kHz/3580 kHz) =223 Hz 1209 Hz ×(800 kHz/3580 kHz) =287 Hz
1633 Hz ×(800 kHz/3580 kHz) =388 Hz When the DTMF signal is detected, the CPU 501 controls the speech reception circuit 520 and switches the feedback resistor Ri in FIG. 7 to either one of R2, R3, and R4 (S31). Since R2, R3, and R4 are set to values such as to cut out the signals within a range of about 300 to 400 Hz as mentioned above, a high frequency component in the DTMF signal is cut out by a high pass filter of the speech reception circuit 520. As mentioned above, by correcting the speech characteristics of the speech reception circuit 520, the sound of the DTMF signal is not heard from the receiver 518.

There is a possibility such that the sound of the DTMF signal is heard for a moment for a period of time until the speech characteristics of the speech reception circuit 520 are switched after the DTMF signal was received. In order to avoid such a situation, it is sufficient that the DTMF signal of the high frequency of 287 Hz is always transmitted to the head of the command. Consequently, the DTMF signal of the head of the command is always set to the voice frequency band or lower and is cut out by the BPF 511 for a period of time until the speech characteristics of the speech reception circuit 520 are switched, so that the sound of the DTMF signal is not heard from the receiver 518.

As mentioned above, when the reception of the DTMF signal near the lower limit of the voice frequency band is finished (S32), the CPU 501 controls the speech reception circuit 520 and switches Ri in FIG. 7 to R1 and returns the speech characteristics to a normal state (S33). The detection result in step S30 is notified to the CPU 501 and the CPU 501 performs the turn-on control of the external line LED of the self apparatus in accordance with the rule of the corresponding command (S34).

In the second embodiment as mentioned above, although the DTMF receiver 515 comprising the switched capacitor filter has been described as an example, the invention is not limited to the above construction so long as the cut-off frequency is decided by the clock which is inputted. An apparatus such as a digital signal processor (DSP) or the like which realizes a filter by the digital process can be also used.

According to the second embodiment, although the turn-on control information of the external line LED has been used as an example in the transmission of the control signal in the in-speech state, the invention can be also similarly applied to a case of realizing another service (for example, a clock display or charge display of liquid crystal is changed or the like).

The third embodiment of the invention will now be described. In the third embodiment, since a whole construction of a system is similar to that of the first embodiment (FIG. 1), it will be described by using the same reference numerals as those in the first embodiment.

Figure 9:
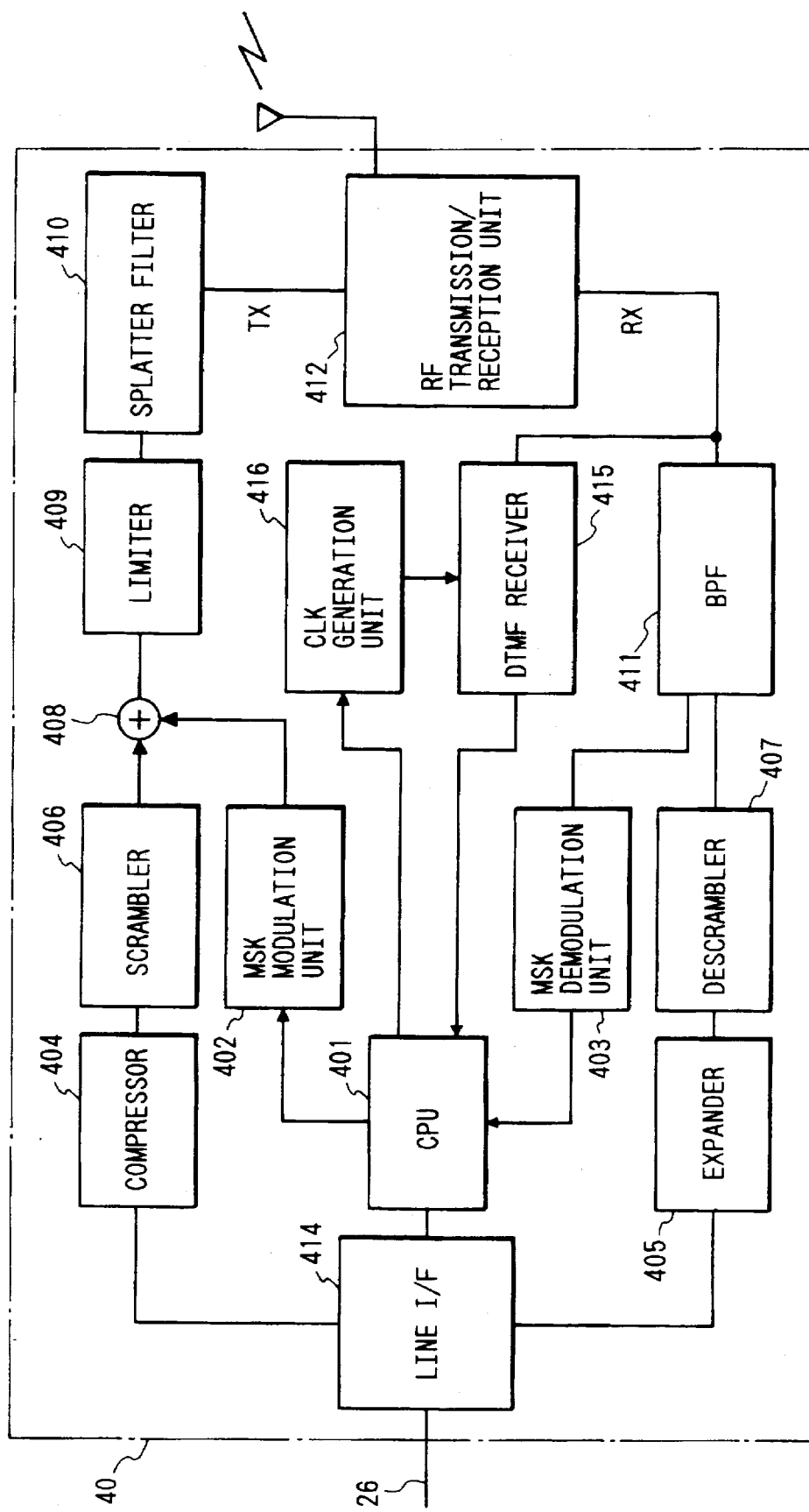
FIG. 9 is a block diagram showing a construction of a master in the third embodiment of the invention.

FIG. 9 is a block diagram showing a construction of the master 40 in the third embodiment.

The master 40 comprises: the control unit (CPU) 401 to control each unit of the master 40; MSK modulation unit 402 for modulating the data of the control information generated from the CPU 401 and transmitting the modulated data as an MSK signal; MSK demodulation unit 403 for demodulating the received MSK signal and extracting the data of the control information and sending to the CPU 401; RF transmission/reception unit 412 for transmitting and receiving the speech signal and control signal to/from the dedicated cordless telephone 50 in a wireless manner; DTMF receiver 415 for receiving and detecting the DTMF signal outside voice frequency band transmitted from the dedicated cordless telephone 50 and notifying to the CPU 401; clock generation unit 416 for generating an operation clock of the DTMF receiver 415; and line interface 414 for transmitting and receiving the speech signal and control signal to/from the main apparatus 30.

A clock frequency which is generated from the clock generation unit 416 is controlled by the CPU 401 so that the DTMF receiver 415 receives the DTMF signal outside voice frequency band. It is now assumed that a construction and the operation of the DTMF receiver 415 are common to those of the DTMF receiver 515 described in FIG. 4 mentioned above and will be explained by using the same reference numerals as those in FIG. 4.

As a transmission system to the dedicated cordless telephone 50, the master 40 further includes the compressor 404, scrambler 406, adding circuit 408, limiter 409, and splatter filter 410. As a reception system from the dedicated cordless telephone 50, the master 40 also includes the band pass filter (BPF) 411, descrambler 407, and expander 405. The transmission and reception will be described in detail hereinlater.

Figure 10:
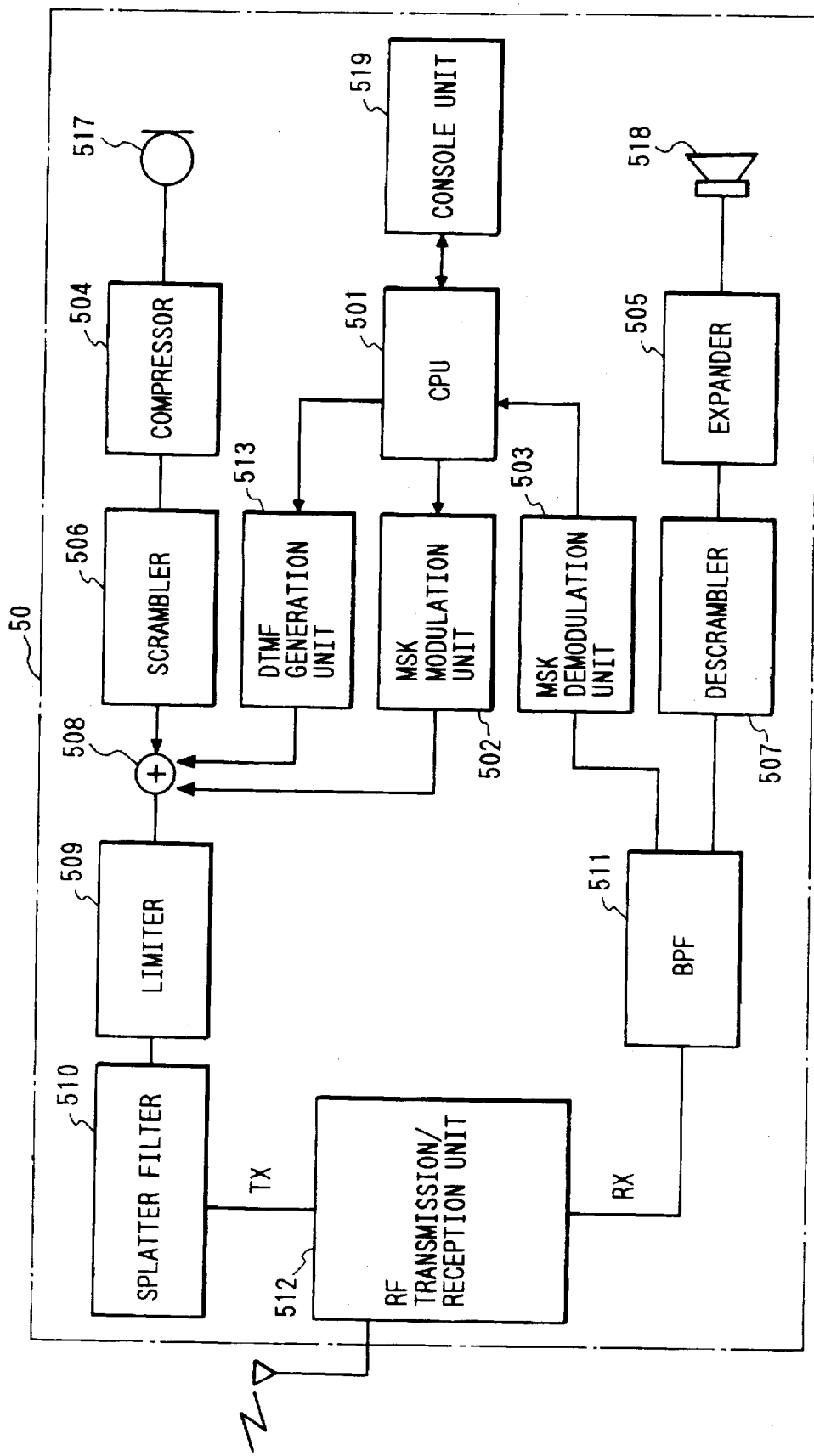
FIG. 10 is a block diagram showing a construction of a dedicated cordless telephone in the third embodiment of the invention.

FIG. 10 is a block diagram showing a construction of the dedicated cordless telephone 50 in the third embodiment.

The dedicated cordless telephone 50 comprises: the control unit (CPU) 501 for controlling each unit of the dedicated cordless telephone; MSK modulation unit 502 for modulating the data of the control information generated from the CPU 501 and transmitting the modulated data as an MSK signal; MSK demodulation unit 503 for decoding the received MSK signal and extracting the data of the control information and sending to the CPU 501; RF transmission/reception unit 512 for transmitting and receiving the speech signal and control signal to/from the master 40 in a wireless manner; and DTMF generation unit 513 for forming the DTMF signal outside voice frequency band by the control of the CPU 501.

As a transmission system to the master 40, the dedicated cordless telephone 50 further includes a transmitter 517, compressor 504, scrambler 506, adding circuit 508, limiter 509, and splatter filter 510. As a reception system from the master 40, the dedicated cordless telephone 50 also includes the band pass filter 511 for allowing only the signal of the voice frequency band to pass, descrambler 507, expander 505, receiver 518, and console unit 519 including a speech button, a dial button, and the like.

An output of the DTMF generation unit 513 is superimposed on the speech signal from the scrambler 506 by the adding circuit 508 and the resultant signal is sent to the master 40. The transmission and reception will be described in detail hereinlater.

The operation of the dedicated cordless telephone 50 will now be described in accordance with a flowchart of FIG. 11. The dedicated cordless telephone 50 waits for the reception of the MSK signal from the master 40 (S501). When the MSK signal is received, an MSK receiving process from the MSK demodulation unit 502 is executed (S502). The control information from the CC 21 in the main apparatus 30 to the dedicated cordless telephone 50 is also included in the received signal. For example, a control of an LED display, LCD, or other displays provided for the console unit 519 of the dedicated cordless telephone, a notification of a status such as standby, in-speech, or the like to the dedicated cordless telephone, and the like are also included.

When the MSK signal is not received in step S501, the apparatus waits for a button input from the console unit 519 of the dedicated telephone (S503). When there is no button input, the apparatus is returned to the reception waiting mode (S501) of the MSK signal.

When there is a button input in step S503, a check is made to see if a process about the inputted button can be uniquely executed in the dedicated cordless telephone or not (S504). For example, in case of a button such as a speech reception volume button which can be processed in the dedicated cordless telephone in accordance with the state at that time is processed as it is in the telephone (S505). In the case where the inputted button cannot be uniquely processed in the telephone, the state notified from the CC 21 is judged (S506). When the notified state is a state other than in-speech, the MSK modulation unit 502 is controlled in order to transmit by the MSK signal in a manner similar to the conventional apparatus.

In step S506, when the state is in-speech, the DTMF generation unit 513 is controlled so as to transmit a holding request or the like by the DTMF signal outside voice frequency band (S507).

As also mentioned in the first embodiment, in recent years, a one-chip microcomputer having therein a D/A converter is generally used. The DTMF signal can be generated by the CPU 501. The generated DTMF signal outside voice frequency band is superimposed on the speech signal by the adding circuit 508. An amplitude of the resultant signal is limited by the limiter 509 in a manner similar to the case of the ordinary speech. A high frequency component which becomes a cause of an overmodulation is cut by the splatter filter 510. The resultant signal is frequency modulated by the RF transmission/reception unit 512 and is transmitted to the master 40 in a wireless manner.

Figure 12:
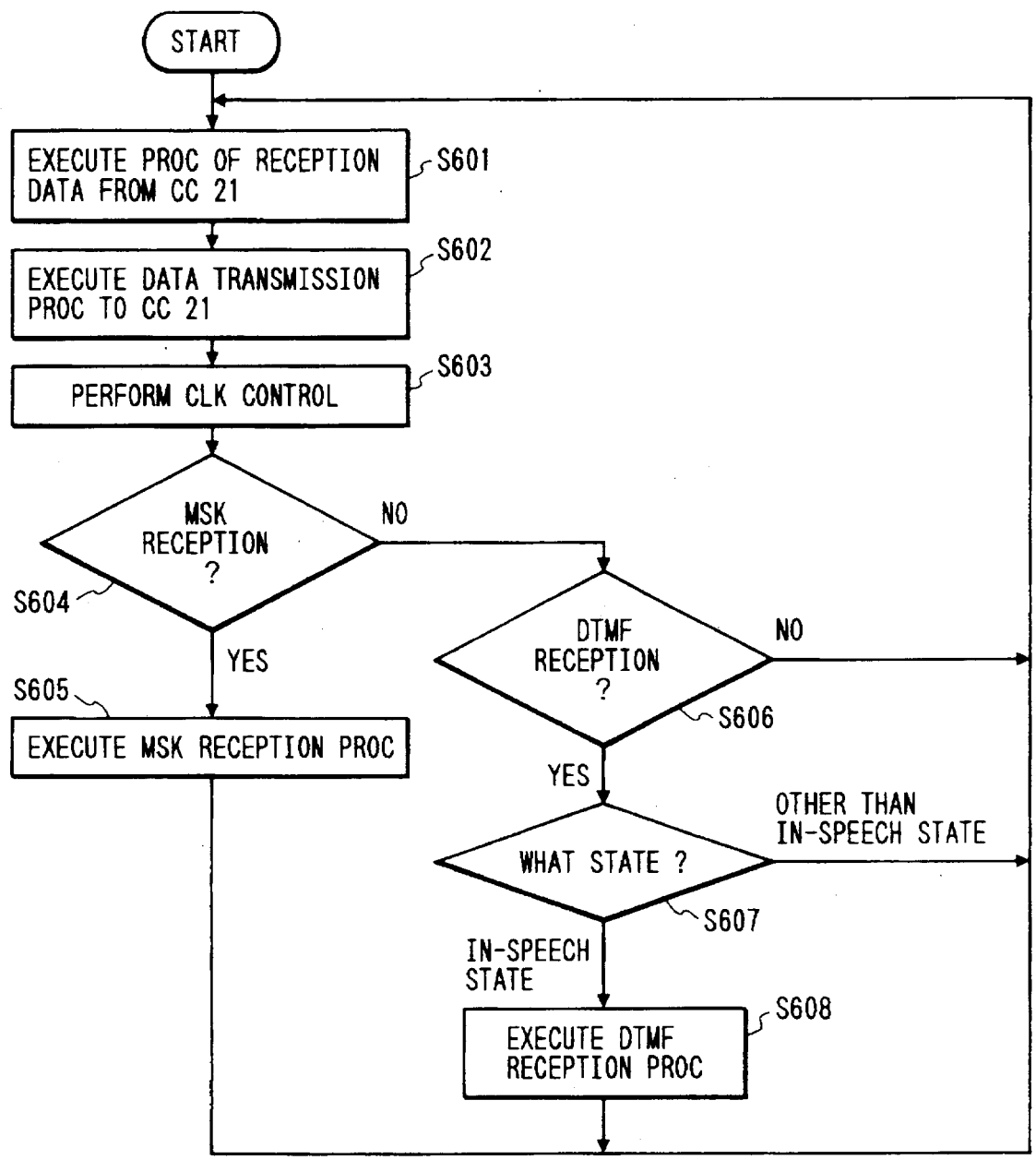
FIG. 12 is a flowchart showing the operation of the master in the fourth embodiment of the invention.

The operation of the master 40 will now be described in accordance with a flowchart of FIG. 12. When the master 40 receives the data from the CC 21 in the main apparatus 30 through the line interface 414, the master executes the received data process (S601). When the received data is the control information to the master 40, the process is executed as it is. When the received data is the control information to the dedicated cordless telephone 50, it is stored into a down transmission data buffer.

When the received data is the data generated in the master 40 or when it is the data received from the dedicated cordless telephone 50 and the data to be transmitted to the CC 21 exists in an up transmission data buffer, a data transmitting process is executed (S602). The clock generation unit 416 is controlled in order to supply a clock to the DTMF receiver 415 (S603). The apparatus waits for reception of the MSK signal from the dedicated cordless telephone 50 (S604).

When the MSK signal is received in step S604, the process of the received data is performed (S605). When the received data can be processed in the master 40 in this instance, it is processed as it is. When it is necessary to transmit the data to the CC 21, the data is stored into the up transmission data buffer.

When the MSK signal is not received in step S604, the apparatus waits for the reception of the DTMF signal (S606). When the DTMF signal is not received in step S606, the processing routine is returned to step S601. When the DTMF signal is received, the state is judged. In case of a state other than the in-speech (S607), the processing routine is returned to step S601 and, in the in-speech state, the receiving process of the DTMF signal is performed (S608).

In the master 40, the frequency demodulation is executed in the RF transmission/reception unit 412 and the DTMF signal outside voice frequency band is received. A clock such as to receive the DTMF signal outside voice frequency band is supplied from the clock generation unit 416 to the DTMF receiver 415. The clock frequency fX that is generated from the clock generation unit 416 is controlled by the CPU 401.

As described in the foregoing equation (1), the frequency of the DTMF signal that is received and detected is decided by fX. Now, assuming that fX=600 kHz, the DTMF signals within low frequencies of 117 to 158 Hz and within high frequencies of 203 to 274 Hz are detected (S10). Namely, 697 Hz ×(600 kHz/3580 kHz) =117 Hz
941 Hz ×(600 kHz/3580 kHz) =158 Hz
1209 Hz ×(600 kHz/3580 kHz) =203 Hz
1633 Hz ×(600 kHz/3580 kHz) =274 Hz The frequencies of those signals are equal to or lower than the voice frequency band and are cut out by the BPF 411. Therefore, they are not transmitted to the descrambler 407 and are not transmitted from the line I/F 414 to the line 26, so that those signals are not heard to the partner in-speech. The detection result is notified to the CPU 401. The CPU 401 stores into the up transmission data buffer as data to be transmitted to the CC 21.

In the above embodiment, the control signal at the time of the speech has been transmitted in only one direction from the dedicated cordless telephone 50 to the master 40. However, as shown in the first and second embodiments, the control signal can be also transmitted in the two-way directions by providing transmitting means for transmitting from the master 40 to the dedicated cordless telephone 50.

Although the above embodiments have been described with respect to the example of the DTMF receiver 415 comprising the switched capacitor filter, the invention is not limited to the construction of the embodiments mentioned above but can be applied to any apparatus so long as the cut-off frequency is determined by the clock to be inputted. For example, a circuit to realize a filter by a digital process such as a digital signal processor (DSP) or the like can be also used.

Although the DTMF signal of the voice frequency band or lower has been used as a control signal, generally, a reproduction level of the receiver or speaker for telephone is almost equal to zero for frequencies lower than 400 Hz as a frequency of the dial tone. Therefore, even if a DTMF signal near the lower limit of the voice frequency band is used, it is hardly heard in the telephone on the partner side. A similar effect is obtained.

In the above description, although a reception data buffer and a transmission data buffer are not particularly shown, a partial area in an RAM (not shown) existing in or out of the CPU 401 is generally used. Since it has already been well known that various data is stored into the buffers, its detailed description is omitted.

The fourth embodiment of the invention will now be described.

According to the fourth embodiment, the DTMF signal near the lower limit of the voice frequency band is transmitted as a control signal by the speech channel. To receive the control signal, a general DTMF receiver is used and an operation clock is changed, thereby changing the frequency to be received and detected and matching with the DTMF signal near the lower limit of the voice frequency band. During the reception, for the voice signal that is transmitted to the telephone line, speech characteristics are corrected so as to suppress the frequency characteristics near the lower limit of the voice frequency band.

In the block diagram of the master 40 shown in FIG. 9, such a process can be realized by setting the cut-off frequency of the band pass filter (BPF) 411 to the lower limit in the voice frequency band, namely, to a value such as to cut out signals of frequencies near 300 to 400 Hz.

In this instance, by controlling the value of the cut-off frequency of the BPF 411 by the CPU 401 and making it variable, frequencies near the lower limit in the voice frequency band can be also cut out only at the time of necessity.

In addition to the BPF 411, such a cutting process can be also realized by inserting a similar high pass filter between the BPF 411 and the line I/F 414.

On the other hand, in the dedicated cordless telephone 50, a DTMF signal near the lower limit of the voice frequency band can be generated by controlling the DTMF generation unit 513 in FIG. 10.

By the construction as mentioned above, the control signal from the dedicated cordless telephone 50 can be transmitted by the DTMF signal near the lower limit of the voice frequency band in the in-speech state.

The DTMF signal near the lower limit of the voice frequency band can be also bidirectionally transmitted between the dedicated cordless telephone 50 and the master 40 during the speech.

Figure 13:
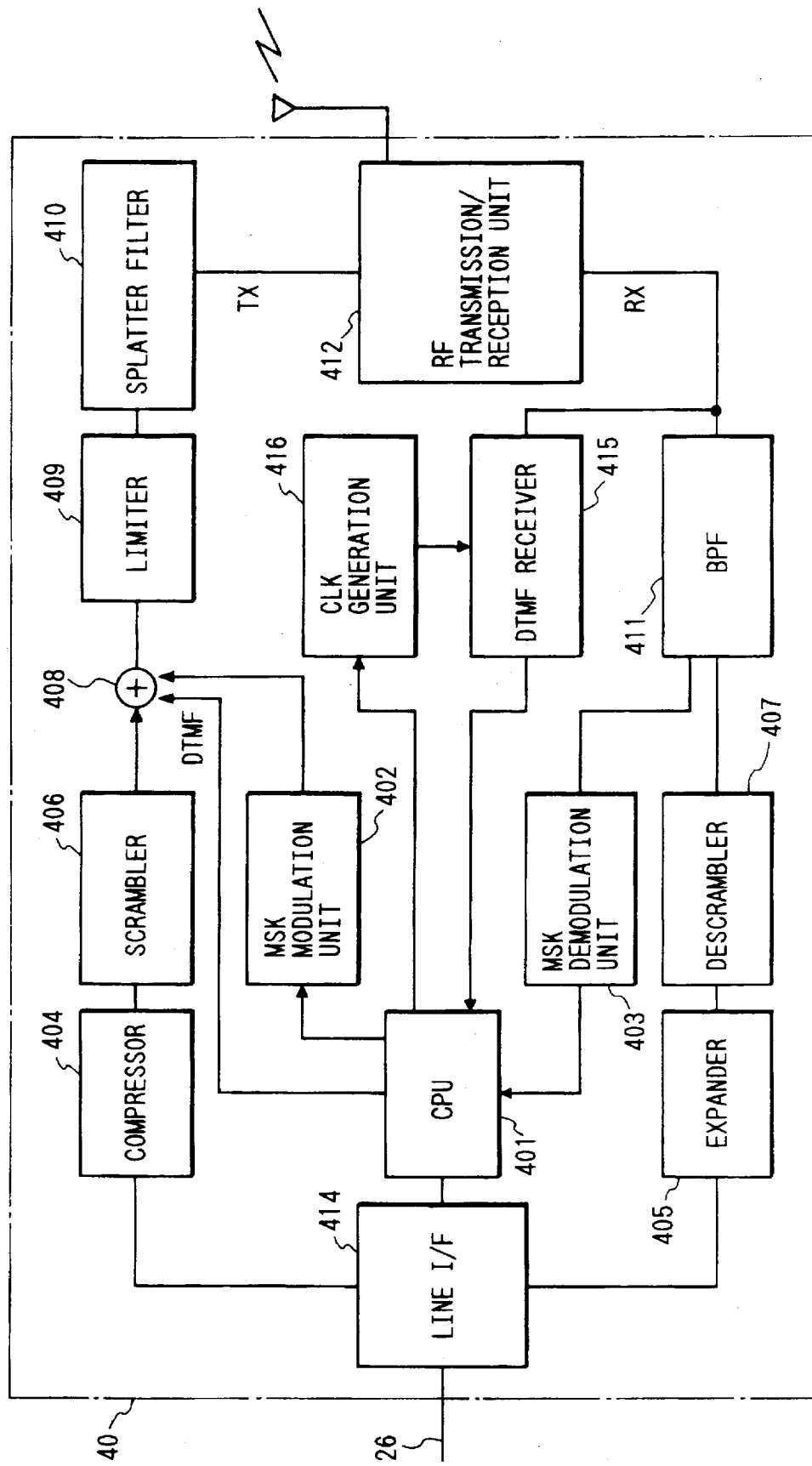
FIG. 13 is a block diagram showing a construction of a master in the fifth embodiment of the invention.
Figure 14:
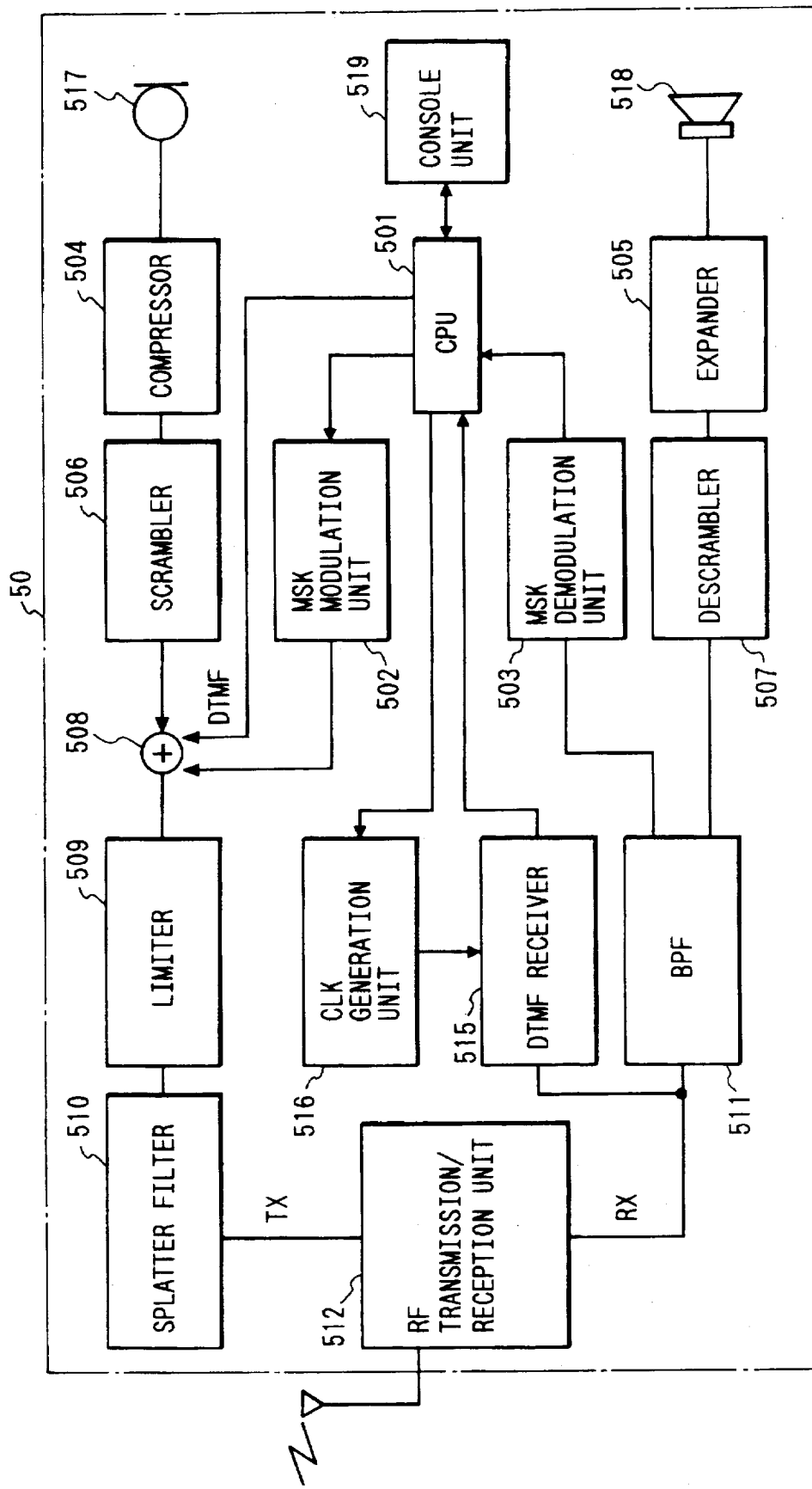
FIG. 14 is a block diagram showing a construction of a dedicated cordless telephone in the fifth embodiment of the invention.

FIGS. 13 and 14 show a construction of the fifth embodiment of the master 40 and slave 50 for transmitting and receiving the control signal during the speech by using the DTMF signal of the voice frequency band or near the lower limit thereof. In FIGS. 13 and 14, the same component elements as those shown in FIGS. 2, 3, 9, and 10 are designated by the same reference numerals. In FIGS. 13 and 14, the CPUs 401 and 501 directly generate the DTMF signal of the voice frequency band or near the lower limit thereof and the DTMF generation units 413 and 513 are omitted. The DTMF receivers 415 and 515 operate so as to detect the DTMF signal of a frequency according to the frequency of the clock that is supplied. When the clock of 600 kHz is supplied, the DTMF signal of the specified frequency is detected. The clock generation units 416 and 516 supply the clocks to the DTMF receivers 415 and 515 so that the voice signal which is transmitted from the line interface 414 to the line 26 and the DTMF signal out of the range of the frequency of the voice signal that is reproduced from the receiver 518 are detected.

Figure 15:
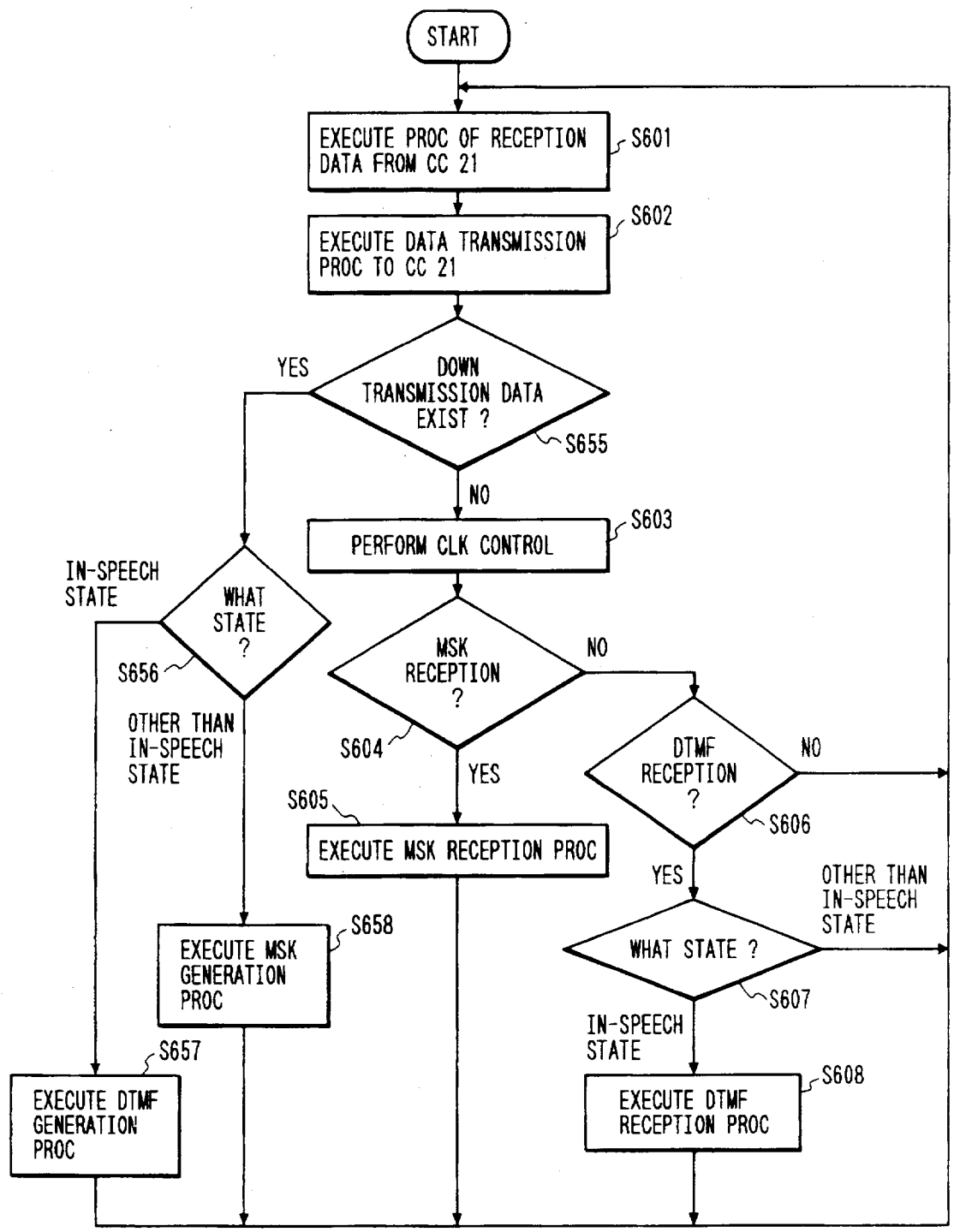
FIG. 15 is a flowchart showing the operation of the master in the fifth embodiment of the invention.

The operation of the master 40 in the embodiment is shown in FIG. 15. In FIG. 15, the processing steps common to those in FIG. 12 are designated by the same reference numerals. In step S655, when the control data to be transmitted to the dedicated cordless telephone 50 exists in the down transmission buffer (S655), the transmitting process is executed. Namely, the state at that time is discriminated (S656). When it is a state other than in-speech, the CPU 401 controls the MSK modulation unit 402 so as to MSK modulate the control data and to transmit through the control channel. In step S656, if the state is in-speech, the CPU 401 transmits the control data by the DTMF signal of the voice frequency band or near the lower limit thereof. In the MSK modulation signal, a high speed communication can be performed by the DTMF signal.

Figure 11:
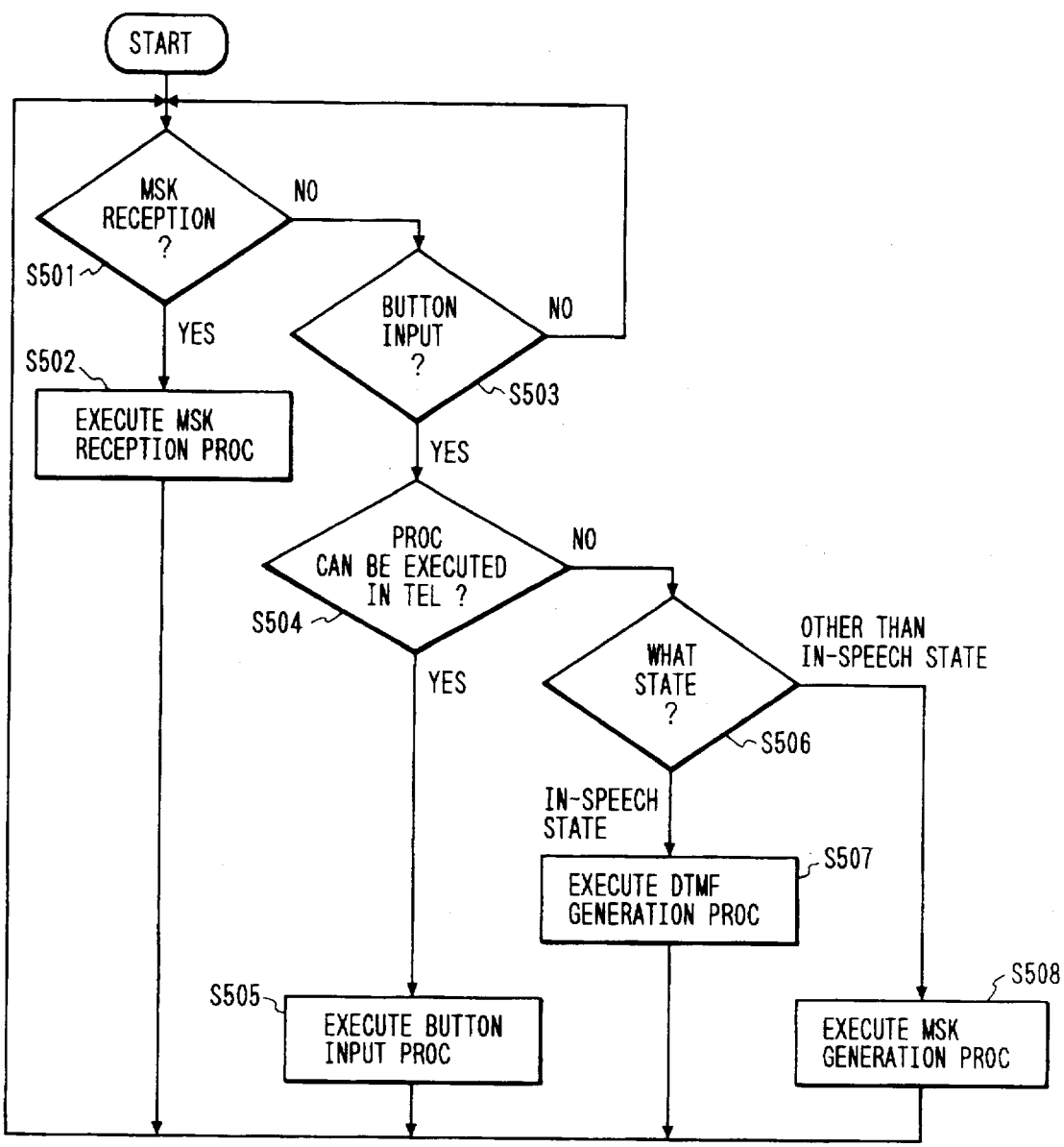
FIG. 11 is a flowchart showing the operation of the dedicated cordless telephone in the fourth embodiment of the invention.

The operation of the slave 50 in the embodiment is almost similar to that in FIG. 11. In step S501, however, the MSK signal and DTMF signal are received. In step S502, the process of the received MSK signal or DTMF signal is executed.

Although the embodiment in the cordless button telephone apparatus has been shown in the above description, the invention can be also applied to a general subscriber's telephone that is used by connecting to the public telephone line or extension of the PBX. Namely, it is sufficient to replace the master 40 to a master of the general subscriber's telephone and to replace the dedicated cordless telephone 50 to a slave.

The relation between the master and the dedicated cordless telephone or the relation between the master and the slave is not limited to the one-to-one corresponding relation. The invention can be also obviously similarly applied to any construction so long as a plurality of dedicated cordless telephones or mobile units can be connected to one master.

The invention is not limited to the apparatus for communicating via the radio line but a simple communication of the control signal can be also performed even in a communication apparatus such as a telephone for communicating through a wire line or the like.

Although the present invention has been described above with respect to the preferred embodiments, the invention is not limited to the foregoing embodiments but many modifications and variations are possible within the spirit and scope of the appended claims of the invention.

What is claimed is:

1. A communication apparatus comprising:
    a detector for detecting a standard DTMF signal when a clock having a first frequency is supplied, and for detecting a control signal other than the standard DTMF signal when a clock, having a second frequency which is pre-determined based on a frequency of the control signal to be detected, is supplied; and
    operating means for executing an operation according to the control signal detected by said detector.

2. An apparatus according to claim 1, wherein said operating means executes a display according to the detection of the control signal.

3. An apparatus according to claim 1, wherein said operating means executes a communication according to said detection output.

4. An apparatus according to claim 1, further comprising supply means for supplying the clock having the second frequency to said detector.

5. An apparatus according to claim 1, wherein said detector is operative to detect the control signal outside a voice frequency band when the clock having the second frequency is supplied.

6. An apparatus according to claim 4, wherein said detector is operative to detect the control signal near the lower limit of a voice frequency band in accordance with the clock supplied from said supply means.

7. An apparatus according to claim 1, further comprising communication means for communicating through a control channel or an information channel.

8. An apparatus according to claim 7, wherein said detecting means detects the control signal received through said information channel in accordance with the clock having the second frequency.

9. An apparatus according to claim 8, further comprising receiving means for receiving a signal via the control channel,
    wherein the data is transmitted by the control channel at a speed higher than that by the information channel.

10. An apparatus according to claim 4, further comprising reproducing means for reproducing a received signal in a reproducing frequency range,
    wherein said detector is operative to detect the control signal outside the reproducing frequency range in accordance with the clock having the second frequency.

11. An apparatus according to claim 1, wherein said detector detects the control signal having two frequencies.

12. An apparatus according to claim 1, wherein said detector detects the control signal received via a radio channel.

13. An apparatus according to claim 1, wherein the second frequency is predetermined based on the first frequency and a ratio of frequencies between the control signal and the standard DTMF signal.

14. A communication apparatus for switching a connection destination of a terminal, comprising:

receiving means for receiving a control signal from said terminal; and switching means for switching the connection destination of the terminal on the basis of said control signal, wherein said receiving means includes a detector for detecting a standard DTMF signal when a clock having a first frequency is supplied, and for detecting a control signal other than the standard DTMF signal when a clock having a second frequency other than the first frequency is supplied, and supply means for supplying said detector with the clock having the second frequency which is predetermined based on a frequency of the control signal to be detected by said detector.

15. An apparatus according to claim 14, further comprising transmitting means for transmitting in a transmission frequency band the signal received from the terminal to a communication partner of said terminal, wherein said supply means supplies a clock such that a signal outside said transmission frequency band is detected by said detector.

16. An apparatus according to claim 14, wherein said detector detects the control signal having two frequencies.

17. An apparatus according to claim 14, wherein said detector detects the control signal received via a radio channel.

18. An apparatus according to claim 14, wherein the second frequency is predetermined based on the first frequency and a ratio of frequencies between the control signal and the standard DTMF signal.

19. A communication apparatus comprising:

a detector for detecting a standard DTMF signal when a clock having a first frequency is supplied, and for detecting a control signal other than the standard DTMF signal when a clock having a second frequency other than the first frequency is supplied; and supply means for supplying said detector with the clock having the second frequency which is predetermined based on a frequency of the control signal to be detected by said detector.

20. An apparatus according to claim 19, further comprising output means for outputting a received signal, wherein said supply means supplies a clock such that a signal outside frequency band that is outputted by said output means is detected.

21. An apparatus according to claim 19, further comprising receiving means for receiving a signal at a speed higher than that of the signal that is detected by said detector in a state in which said apparatus is not connected to a communication partner.

22. An apparatus according to claim 19, wherein said detector detects the control signal having two frequencies.

23. An apparatus according 19, wherein said detector detects the control signal received via a radio channel.

24. An apparatus according to claim 19, wherein the second frequency is predetermined based on the first frequency and a ratio of frequencies between the control signal and the standard DTMF signal.

25. A method for controlling a communication apparatus including a DTMF detector for detecting a standard DTMF signal when a clock having a first frequency is supplied, comprising the steps of:

supplying the DTMF detector with a clock having a second frequency which is predetermined based on a frequency of a control signal to be detected by the DTMF detector; and controlling an operation of the communication apparatus according to the control signal other than the standard DTMF signal detected by the DTMF detector to which the clock of the second frequency is supplied.

26. A method according to claim 25, wherein a display is controlled in said controlling step according to the detection of the control signal.

27. A method according to claim 25, wherein the clock is supplied to the DTMF detector in said supplying step such that the control signal outside a voice frequency band is detected.

28. A method according to claim 25, wherein the clock is supplied to the DTMF detector in said supplying step such that the control signal near the lower limit of a voice frequency band is detected.

29. A method according to claim 25, wherein the clock having the second frequency is supplied in said supplying step such that the control signal having two frequencies is detected by the DTMF detector.

30. A method according to claim 25, wherein the operation of the communication apparatus is controlled in said controlling step according to the control signal received via a radio channel.

31. A method according to claim 25, wherein the second frequency is predetermined based on the first frequency and a ratio of frequencies between the control signal and the standard DTMF signal.

32. A communication system comprising:

a transmitter for transmitting a control signal; and a receiver for receiving the control signal, wherein said receiver comprises a detector for receiving a standard DTMF signal when a clock having a first frequency is supplied, and for detecting the control signal other than the standard DTMF signal when a clock having a second frequency is supplied; and further comprising supply means for supplying said detector with the clock having the second frequency which is predetermined based on a frequency of the control signal transmitted by said transmitter.

33. A system according to claim 32, wherein said receiver performs display according to the control signal detected by said detector.

34. A system according to claim 32, wherein said transmitter transmits the control signal outside a voice frequency band.

35. A system according to claim 32, wherein said transmitter transmits the control signal at a level near the lower limit of a voice frequency band.

36. A system according to claim 32, wherein said transmitter transmits the control signal having two frequencies.

37. A system according to claim 32, wherein said transmitter transmits the control signal via a radio channel.

38. A system according to claim 32, wherein the second frequency is predetermined based on the first frequency and a ratio of frequencies between the control signal and the standard DTMF signal.

* * * * *